US009122046B2

(12) United States Patent
Liang

(10) Patent No.: US 9,122,046 B2
(45) Date of Patent: Sep. 1, 2015

(54) IMAGING LENS

(71) Applicant: Yuan-Fan Liang, Taichung (TW)

(72) Inventor: Yuan-Fan Liang, Taichung (TW)

(73) Assignees: SINTAI OPTICAL (SHENZHEN) CO., LTD., Guandong, Province (CN); Asia Optical International Ltd., Tortola (VG)

( * ) Notice: Subject to any disclaimer, the term of this patent is extended or adjusted under 35 U.S.C. 154(b) by 185 days.

(21) Appl. No.: 13/691,850

(22) Filed: Dec. 3, 2012

(65) Prior Publication Data
US 2013/0286487 A1 Oct. 31, 2013

(30) Foreign Application Priority Data
Apr. 27, 2012 (TW) .............................. 101115221 A

(51) Int. Cl.
G02B 13/18 (2006.01)
G02B 13/00 (2006.01)
(52) U.S. Cl.
CPC ............ *G02B 13/18* (2013.01); *G02B 13/0045* (2013.01)
(58) Field of Classification Search
CPC ........................... G02B 13/0045; G02B 13/18
USPC .................. 359/762–764, 766, 770
See application file for complete search history.

(56) References Cited

U.S. PATENT DOCUMENTS

| 7,342,723 | B2 * | 3/2008 | Rodriguez et al. ............ 359/649 |
| 7,502,181 | B2 | 3/2009 | Shinohara |
| 7,864,454 | B1 | 1/2011 | Tang et al. |
| 8,072,695 | B1 * | 12/2011 | Lee et al. ...................... 359/764 |
| 8,456,758 | B1 * | 6/2013 | Huang et al. .................. 359/714 |
| 8,659,838 | B2 * | 2/2014 | Konishi et al. ................ 359/714 |
| 2011/0134305 | A1 * | 6/2011 | Sano et al. ..................... 348/340 |
| 2011/0249346 | A1 * | 10/2011 | Tang et al. ..................... 359/764 |

FOREIGN PATENT DOCUMENTS

| TW | 200736655 | 10/2007 |
| TW | 201038966 | 11/2010 |
| TW | 201144890 | 12/2011 |
| WO | WO 2010143459 A1 * | 12/2010 |

OTHER PUBLICATIONS

"Office Action of Taiwan Counterpart Application", issued on Feb. 24, 2014, p. 1-p. 4.

* cited by examiner

*Primary Examiner* — Thomas K Pham
*Assistant Examiner* — Vipin Patel
(74) *Attorney, Agent, or Firm* — Jianq Chyun IP Office

(57) ABSTRACT

An imaging lens including the first~fifth lens arranged in sequence from an object side to an image side is provided. The first lens has at least one aspheric surface. The second lens with negative optical power has at least one aspheric surface and a convex surface facing towards the object side. The third lens with positive optical power has at least one aspheric surface and a concave surface facing towards the object side. The fourth lens with negative optical power has at least one aspheric surface and a concave surface facing towards the image side. The fifth lens with positive optical power has at least one aspheric surface and a convex surface facing towards the object side. By the above arrangement, the imaging lens has a shorter optical total length and a larger aperture for enhancing the image quality.

14 Claims, 3 Drawing Sheets

IMAGING LENS

CROSS-REFERENCE TO RELATED APPLICATION

This application claims the priority benefit of Taiwan application serial no. 101115221, filed on Apr. 27, 2012. The entirety of the above-mentioned patent application is hereby incorporated by reference herein and made a part of this specification.

BACKGROUND OF THE INVENTION

1. Technical Field

The invention relates to a lens, and more particularly to an imaging lens.

2. Related Art

In recent years, the market for the portable electronic products such as slim digital camera, mobile phone or tablet personal computer is booming with the benefit of advancing technology. For such products, photography or shooting is already one of the indispensable functions. Under this circumstance, the demand for miniaturized imaging lens is increasingly higher.

Regarding the entry-type of low pixel camera module, a suitable imaging lens may be composed of 2 lenses or less, in order to satisfy the requirement for resolving images. The required quantity of lenses for an imaging lens may also increase with the increase of in the number of pixels, such as a camera module with more than two million pixels requires four lenses to compose of an imaging lens. Besides, in order to satisfy a camera module with more than eight millions pixels, five lenses are generally adopted to compose of an image lens. In other words, when the imaging lens of a camera module uses more lenses, the entire optical length of the imaging lens may become longer, but this may cause the following issue, i.e., unable to satisfy the requirement of slim camera module.

At the current stage, in the increasing trend toward slim and high performance of the electronic products, designing an imaging lens having a shorter optical length and a fine aperture with the limited number of lenses (such as a configuration with five lenses) has become an important issue in the related fields.

SUMMARY

The invention provides an imaging lens capable of achieving a preferably optical performance and has a shorter optical length.

The invention provides an imaging lens comprising the following lenses arranged in sequence from an object side to an image side: a first lens, a second lens, a third lens, a fourth lens and a fifth lens. The first lens has at least one aspheric surface.

The second lens has negative optical power and has at least one aspheric surface and a convex surface of the second lens is facing toward the object side. The third lens has positive optical power and has at least one aspheric surface and a concave surface of the third lens is facing toward the object side. The fourth lens has negative optical power and has at least one aspheric surface and a concave surface of the fourth lens is facing toward the image side. The fifth lens has positive optical power and has at least one aspheric surface and a convex surface of the fifth surface is facing toward the object side.

In an embodiment of the invention, the imaging lens further comprises an aperture that is disposed at a position between a surface of the first lens facing the object side and a surface of the first lens facing the image side.

In an embodiment of the invention, the fifth lens has at least two inflection points.

In an embodiment of the invention, the imaging lens has a back focal length $D_{bf}$, and a distance from a surface of the first lens facing the object side to an image plane is set as an optical total length D, which satisfy:

$$0.25 < D_{bf}/D.$$

In an embodiment of the invention, a distance from a surface of the first lens facing the object side to an image plane is set as an optical total length D, and a half image height of an image located at the image plane is ImaH, which satisfy:

$$\text{ImaH}/D > 0.59.$$

In an embodiment of the invention, a focal length of the fourth lens is f4, and a focal length of the fifth lens is f5, which satisfy:

$$0.1 < \left|\frac{f4}{f5}\right| < 0.3.$$

In an embodiment of the invention, the imaging lens has a focal length f, and the first lens has a focal length f1, which satisfy:

$$0.65 < \left|\frac{f1}{f}\right| < 0.85.$$

In an embodiment of the invention, the imaging lens has a focal length f, and a distance between the first lens and the second lens is D12, which satisfy:

$$27 < \frac{f}{D12} < 195.$$

In an embodiment of the invention, a distance between the first lens and the second lens is D12, and a distance between the third lens and the fourth lens is D34, which satisfy:

$$1 < \frac{D12}{D34} < 7.$$

In an embodiment of the invention, the imaging lens has a focal length f, and a distance between the fourth lens and the fifth lens is D45, which satisfy:

$$16 < \frac{f}{D45} < 26.$$

As described above, the imaging lens of the invention comprises the first~fifth lenses, and each of the lenses has at least one aspheric surface. Moreover, the imaging lens may further have an aperture and a transparent element. The imaging lens may obtain an outstanding optical performance, a shorter optical total length and a larger aperture by satisfying the designed optical parameters for each of the optical elements, thereby the imaging lens may be applied in a variety of high pixel and slim camera modules.

In order to make the features and advantages of the present invention more comprehensible, the present invention is further described in detail in the following with reference to the embodiments and the accompanying drawings.

BRIEF DESCRIPTION OF THE DRAWINGS

The accompanying drawings constituting a part of this specification are incorporated herein to provide a further understanding of the disclosure. Here, the drawings illustrate embodiments of the disclosure and, together with the description, serve to explain the principles of the disclosure.

DESCRIPTION OF EMBODIMENTS

Figure 1A:
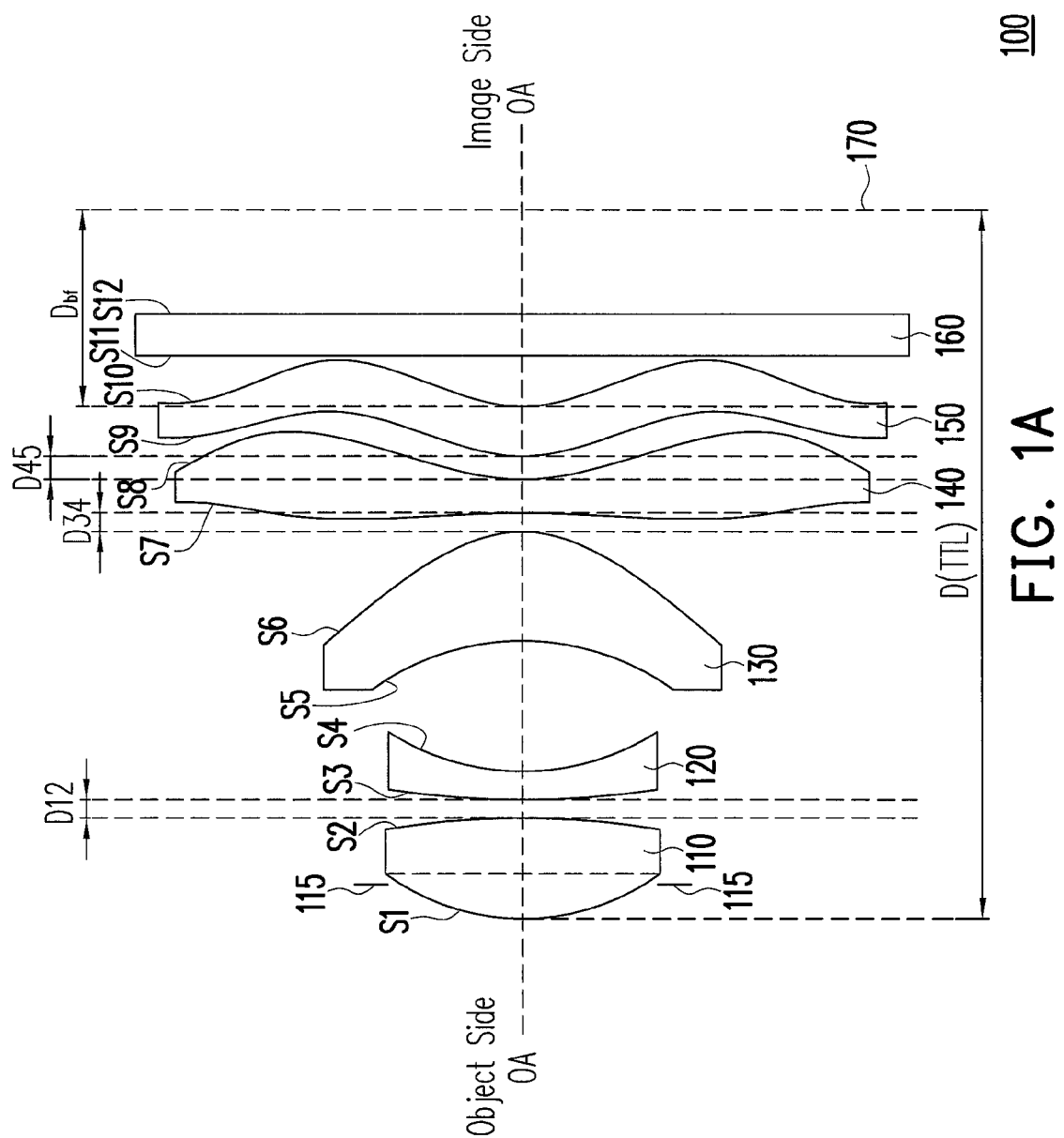
FIG. 1A is a schematic diagram of the imaging lens 100 according to the embodiment of the invention.

FIG. 1A is a schematic diagram of the imaging lens 100 according to the embodiment of the invention. Referring to FIG. 1A, the imaging lens 100 arranged in sequence from the object side to the image side comprises: a first lens 110, a second lens 120, a third lens 130, a fourth lens 140 and a fifth lens 150. The first lens 110 has at least one aspheric surface. The second lens 120 has negative optical power and includes at least one aspheric surface, and a convex surface S3 of the second lens 120 is facing toward the object side. The third lens 130 has positive optical power and includes at least one aspheric surface, and a concave surface S5 of the third lens 130 is facing toward the object side. The fourth lens 140 has negative optical power and includes at least one aspheric surface, and a concave surface S8 of the fourth lens 140 is facing toward the image side. The fifth lens 150 has positive optical power and includes at least one aspheric surface, and a convex surface S9 of the fifth lens 150 is facing toward the object side.

Referring to FIG. 1A, the first lens 110 may have positive refractive power, and the first lens 110 has a surface S1 facing the object side and a surface S2 facing the image side, and at least one surface of the surfaces S1, S2 is an aspheric surface. The first lens 110, for example, may be a biconvex lens.

The second lens 120 is disposed between the first lens 110 and the image side, and the second lens 120 may have negative refractive power. The second lens 120 has a convex surface S3 facing the object side and a surface S4 facing the image side, and at least one surface of the surfaces S3, S4 is an aspheric surface. The second lens 120, for example, may be a meniscus negative lens.

The third lens 130 is disposed between the second lens 120 and the image side, and the third lens 130 may have positive refractive power. The third lens 130 has a concave surface S5 facing the object side and a surface S6 facing the image side, and at least one surface of the surfaces S5, S6 is an aspheric surface. The third lens 130, for example, may be a meniscus positive lens.

The fourth lens 140 is disposed between the third lens 130 and the image side, and the fourth lens 140 may have negative refractive power. The fourth lens 140 has a surface S7 facing the object side and a concave surface S8 facing the image side, and at least one surface of the surfaces S7, S8 is an aspheric surface. The fourth lens 140, for example, may be a negative lens.

The fifth lens 150 is disposed between the fourth lens 140 and the image side. The fifth lens 150 may have positive refractive power. The fifth lens 150 has a convex surface S9 facing the object side and a surface S10 facing the image side, and at least one surface of the surfaces S9, S10 is an aspheric surface. The fifth lens 150, for example, may be a positive lens.

By the above-described arrangement of the lens, even under the configuration with five lenses, an optical length of the imaging lens 100 may still be reduced effectively and the imaging lens 100 may have a longer back focal length. In this way, the imaging lens 100 is capable to be easily assembled to a high pixel and slim camera module.

Referring to FIG. 1A again, the imaging lens 100 may further comprise an aperture 115 that is disposed at a position between the surface S1 of the first lens 110 facing the object side and the surface S2 of the first lens 110 facing the image side. The aperture 115 is used to control a total amount of a light which enters the imaging lens 100. By the above-described disposition of the aperture 115, the aperture 115 of the imaging lens 100 may become larger and a shutter time may be reduced, in order to obtain a preferably image quality.

The imaging lens 100 may further comprise a transparent element 160 that is located at a side of the fifth lens 150 facing the image side. The transparent element 160 has a surface S11 facing the object side and a surface S12 facing the image side. The transparent element 160 may be disposed at a side of the fifth lens 150 facing the image side depending on the required optical effect. In more detail, the transparent element 160 may be a plate glass or a filter element (such as an infrared filter element), in order for an imaging light to pass through smoothly and filter out a light disturbing the image definition. The material of the transparent element 160 may be plastic or other applicable materials for fabricating the transparent element 160.

In the imaging lens 100, at least any one of the first lens 110, the second lens 120, the third lens 130, the fourth lens 140 and the fifth lens 150 may be fabricated with the plastic material or other applicable materials for fabricating lens. Moreover, when the first lens 110, the second lens 120, the third lens 130, the fourth lens 140 and the fifth lens 150 are all fabricated by using plastic, the weight and the fabrication cost of the imaging lens 100 may be reduced.

According to the above descriptions, the first lens 110, the second lens 120, the third lens 130, the fourth lens 140 and the fifth lens 150 all have at least one aspheric surface, through which the sufficient optical control parameters may be obtained, thereby achieving the design purpose of shorter optical length of the imaging lens 100.

For example, referring to FIG. 1A, the optical design may allow the fifth lens 150 to have at least two inflection points. In other words, the fifth lens 150 may carry out one or two turnings from the centre towards the edge, through which the progress path of the light may be controlled effectively. Furthermore, the fifth lens 150 may have a uniform thickness. In this way, the fifth lens 150 is able to be fabricated easily. Moreover, the imaging lens 100 may have a smaller chief ray angle by the shape of the fifth lens 150.

In general, an image light of a photographed object (not shown) forms an image on an image plane 170 of the image side through the imaging lens 100. A photo sensor (not shown) may be disposed on the image plane 170, such as a charge coupled device (CCD), a complementary metal-oxide-semiconductor (CMOS) sensor and the like, which is used to sense the image light. A distinct image may be formed on the image plane 170 by the above-described outstanding optical performance of the imaging lens 100.

The designed optical parameters of the first lens 110, the second lens 120, the third lens 130, the fourth lens 140 and the fifth lens 150 of the imaging lens 100 and a variety of possible embodiments are further described in detail hereafter. The imaging lens 100 may obtain an outstanding optical performance, a shorter optical length and a larger aperture by satisfying the following conditions of the formulas (1)~(7).

Referring to FIG. 1A, in the imaging lens 100, the distance from the surface S1 of the first lens 110 facing the object side to the image plane 170 along the optical axis OA is set as an optical total length D; and the distance from the surface S10 of the fifth lens 150 facing the image side to the image plane 170 along the optical axis OA is set as a back focal length $D_{bf}$. Namely, the imaging lens 100 has the back focal length $D_{bf}$ and the distance from the surface S1 of the first lens 110 facing the object side to the image plane 170 is set as the optical total length D, which satisfy the condition of formula (1):

$$0.25 < D_{bf}/D \tag{1}$$

By satisfying the condition of formula (1), the imaging lens 100 may have a longer back focal length.

Referring to FIG. 1A again, in the imaging lens 100, when an image is formed on the image plane 170, the half image height of the image is ImaH, and the distance from the surface S1 of the first lens 110 facing the object side to the image plane 170 is set as a optical total length D, which satisfy the condition of formula (2):

$$\text{ImaH}/D > 0.59 \tag{2}$$

By satisfying the condition of formula (2), which avails the imaging lens 100 to have a smaller volume for conveniently applying in a small volume of camera module.

In addition, referring to FIG. 1A, in the imaging lens 100, a focal length of the fourth lens 140 is f4 and a focal length of the fifth lens 150 is f5, and which satisfy the conditions of formula (3):

$$0.1 < \left|\frac{f4}{f5}\right| < 0.3 \tag{3}$$

By satisfying the conditions of formula (3), the optical disposition relationship of the fourth lens 140 and the fifth lens 150 may be optimized.

Furthermore, a focal length of the imaging lens 100 is set as f and a focal length of the first lens 110 is set as f1, and which satisfy the conditions of formula (4):

$$0.65 < \left|\frac{f1}{f}\right| < 0.85 \tag{4}$$

By satisfying the conditions of formula (4), the optical disposition relationship of the first lens 110 in the imaging lens 100 may be optimized.

In addition, a focal length of the imaging lens 100 is set as f and a distance between the first lens 110 and the second lens 120 is set as D12, and which satisfy the conditions of formula (5):

$$27 < \frac{f}{D12} < 195 \tag{5}$$

By satisfying the conditions of formula (5), the optical disposition relationship of the first lens 110 and the second lens 120 in the imaging lens 100 may be optimized.

Moreover, a distance between the first lens 110 and the second lens 120 is set as D12 and a distance between the third lens 130 and the fourth lens 140 is set as D34, which satisfy the conditions of formula (6):

$$1 < \frac{D12}{D34} < 7 \tag{6}$$

By satisfying the conditions of formula (6), the optical disposition relationship of the group of the first lens 110 and the second lens 120 and the group of third lens 130 and the fourth lens 140 in the imaging lens 100, may be optimized.

Furthermore, the imaging lens 100 has a focal length f and a distance between the fourth lens 140 and the fifth lens 150 is D45, which satisfy the conditions of formula (7):

$$16 < \frac{f}{D45} < 26 \tag{7}$$

When the above-described optical conditions of formula (1) ~ formula (7) are satisfied in accordance with the designed optical requirement, the imaging lens 100 may obtain the characteristics of outstanding optical performance, shorter optical length and larger aperture. For example, the imaging lens 100 may have the view range of 70° ~75°; the imaging lens 100 may have the chief ray angle of 0~27.5°; and the imaging lens 100 may have the f-number of 2~3.

The related optical parameters of every optical elements of the imaging lens 100 in this embodiment are illustrated hereinafter. It should be noted that the following description and the listed data in Table 1 and 2 are not intended to limit the invention. Any person skilled in the art may make some appropriate alternations on the parameters or settings with the reference to the invention, which may still be considered as within the scope of the invention.

TABLE 1

| Focal length: 3.828 mm, F-number: 2.05 | | | | | |
|---|---|---|---|---|---|
| Surface number | Radius of Curvature (mm) | Distance (mm) | Index of Refractive (Nd) | Abbe Number (Vd) | Notes |
| STOP | ∞ | −0.2594931 | | | Aperture (115) |
| S1 | 1.602276 | 0.72395 | 1.5146 | 56.9635 | First Lens (110) |
| S2 | −9.520312 | 0.02 | | | |
| S3 | 3.413151 | 0.2 | 1.6332 | 23.4299 | Second Lens (120) |
| S4 | 1.534034 | 0.8288442 | | | |
| S5 | −2.919626 | 0.7927069 | 1.5441 | 56.0936 | Third Lens (130) |
| S6 | −0.9711592 | 0.02 | | | |
| S7 | −13.95642 | 0.3 | 1.5146 | 56.9635 | Fourth Lens (140) |
| S8 | 1.192398 | 0.15 | | | |
| S9 | 0.8331096 | 0.3631507 | 1.5441 | 56.0936 | Fifth Lens (150) |

TABLE 1-continued

Focal length: 3.828 mm, F-number: 2.05

| Surface number | Radius of Curvature (mm) | Distance (mm) | Index of Refractive (Nd) | Abbe Number (Vd) | Notes |
|---|---|---|---|---|---|
| S10 | 0.8761158 | 0.35 | | | |
| S11 | ∞ | 0.3 | 1.5231 | 54.49 | Transparent Element (160) |
| S12 | ∞ | 0.751086193 | | | |

In Table 1, the "Distance" refers to a linear distance between two neighboring surfaces on the optical axis OA. For example, "the distance of the surface S1" refers to the linear distance between the surface S1 and the surface S2 on the optical axis OA (i.e., a thickness of the first lens 110 along the optical axis OA).

In Table 1, the focal length of the imaging lens 100 is 3.828 (mm) and the f-number is 2.05. In the Notes column of Table 1, the corresponding distance, index of refractive and Abbe number of each optical element (the aperture 115, the first lens 110, the second lens 120, the third lens 130, the fourth lens 140, the fifth lens 150 and the transparent element 160) can be referred to the numerical values corresponding to each distance, index of refractive and the Abbe number listed on the same row. As for the design of the imaging lens 100, the index of refractive and the Abbe number of each optical element are also the important optical parameters, which are listed together in Table 1 as the design reference. Furthermore, according to the same principle of the above-described definition for the distance, the thickness of other optical elements along the optical axis OA may be obtained.

Referring to FIG. 1A simultaneously, in Table 1, STOP represents the aperture 115; the surfaces S1, S2 are the two surfaces of the first lens 110; the surfaces S3, S4 are the two surfaces of the second lens 120; the surfaces S5, S6 are the two surfaces of the third lens 130; the surfaces S7, S8 are the two surfaces of the fourth lens 140; the surfaces S9, S10 are the two surfaces of the fifth lens 150; and the surfaces S11, S12 are the two surfaces of the transparent element 160, wherein the distance of the surface S12 is the distance from the surface S12 to the image plane 170.

According to the above descriptions, the first lens 110, the second lens 120, the third lens 130, the fourth lens 140 and the fifth lens 150 in the imaging lens 100 are the optical elements that may have at least one aspheric surface. In this embodiment, S1~S10 may all be aspheric and may apply formula (8) to define aspheric:

$$Z = \frac{ch^2}{1 + (1 - (k+1)c^2h^2)^{\frac{1}{2}}} + Ah^4 + Bh^6 + Ch^8 + Dh^{10} + Eh^{12} + Fh^{14} + Gh^{16} \quad (8)$$

In formula (8), Z is the sag in the optical axis OA direction and c is the reciprocal of the radius of the osculating sphere, namely, c is the reciprocal of the radius of curvature (such as the radius of curvature of S1~S10 in Table 1) near the optical axis OA. k is the $2^{nd}$ order conic coefficient. h is the aspheric height, that is, the height from the center to the edge of the lens. A~G are the aspheric coefficients. The parameter values of the surfaces S1~S10 are listed in Table 2.

TABLE 2

| Surface Number | k | A | B | C |
|---|---|---|---|---|
| S1 | −0.8954916 | 0.0242 | 0.01422 | −0.01076 |
| S2 | −231.1665 | 0.060716 | −0.12713 | 0.026144 |
| S3 | −27.63517 | 0.036591 | −0.02609 | −0.11023 |
| S4 | −7.79272 | 0.12838 | −0.02939 | −0.02248 |
| S5 | 5.8213 | −0.12136 | 0.091335 | −0.06001 |
| S6 | −1.602019 | 0.021713 | −0.05982 | 0.020687 |
| S7 | 0 | 0.021932 | −0.00064 | −0.00076 |
| S8 | −8.585397 | −0.02242 | 0.000298 | 0.000621 |
| S9 | −4.783519 | −0.05717 | 0.002523 | 0.000647 |
| S10 | −4.821969 | −0.06418 | 0.006998 | −0.00069 |

| Surface Number | D | E | F | G |
|---|---|---|---|---|
| S1 | −0.05565 | 0.120613 | −0.09932 | 0.016345 |
| S2 | −0.00189 | −0.03671 | 0.061038 | −0.03514 |
| S3 | 0.012853 | 0.113169 | −0.0493 | −0.00525 |
| S4 | 0.009826 | 0.009093 | 0.056806 | −0.0374 |
| S5 | 0.056711 | 0.019083 | −0.03535 | 0.011662 |
| S6 | 0.007709 | 0.001604 | −0.00153 | −0.00031 |
| S7 | 0.000141 | −1.22-E05 | 6.30E−07 | 0 |
| S8 | −0.00015 | 9.94E−06 | 4.50E−08 | 0 |
| S9 | −2.31E−07 | −4.26E−06 | −1.53E−07 | 0 |
| S10 | 0.000145 | −9.74E−06 | 0 | 0 |

Figure 1C:
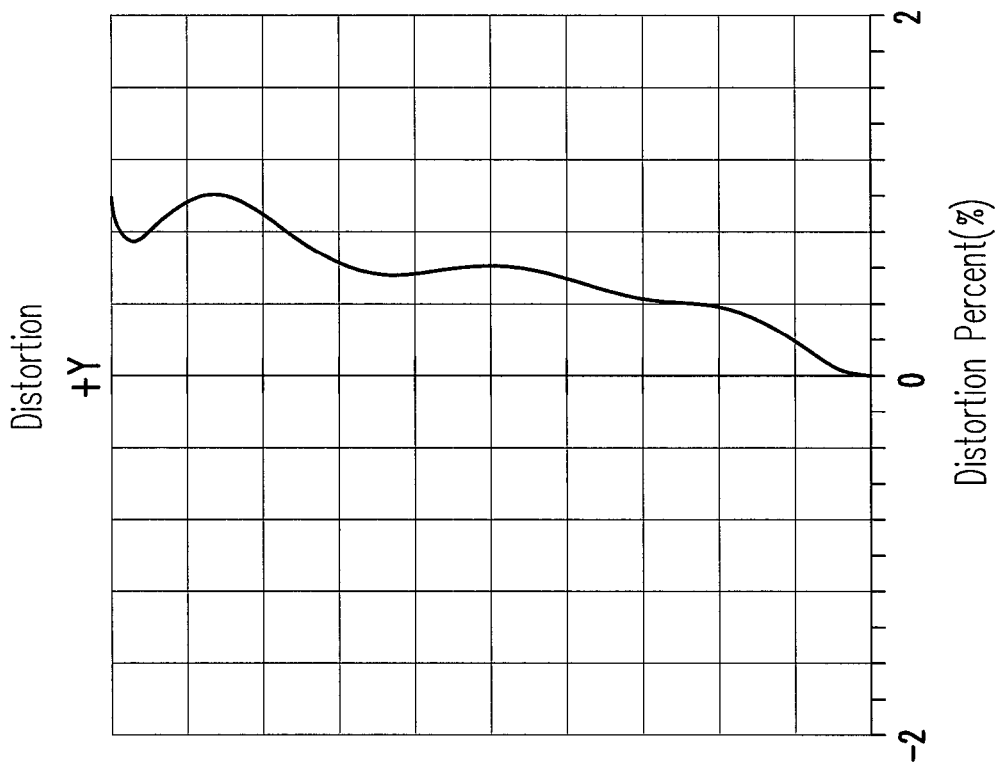
FIG. 1C is a curve diagram of a distortion of the imaging lens 100.
Figure 1B:
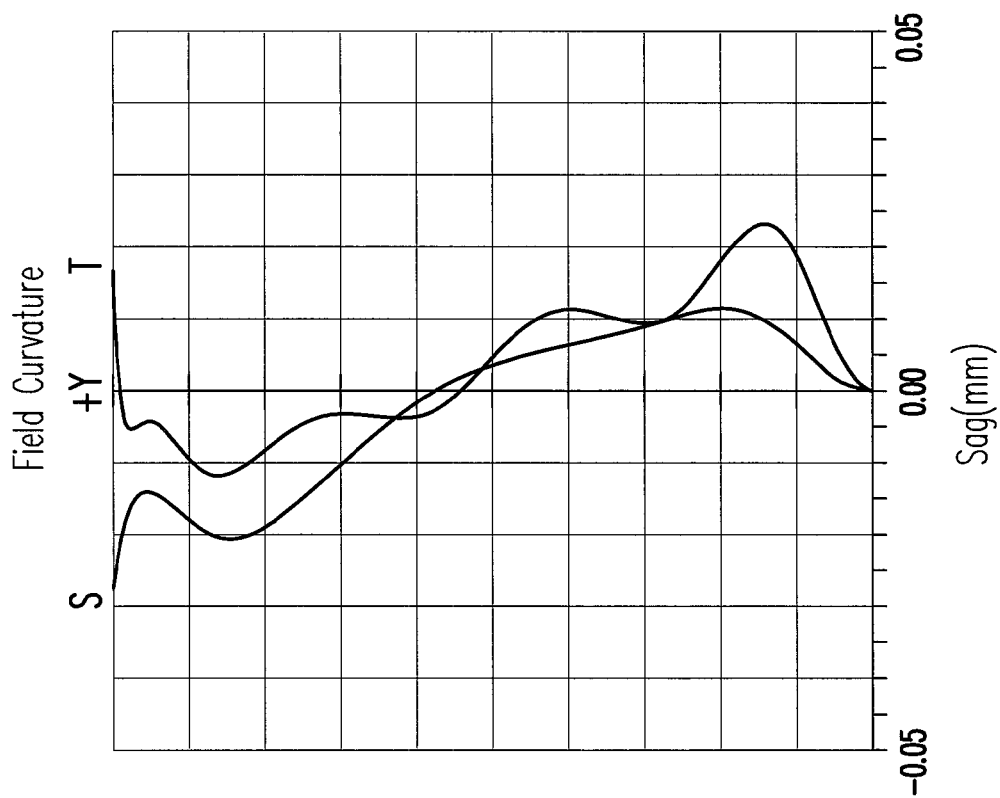
FIG. 1B is a curve diagram of a field curvature of the imaging lens 100.
Figure 1E:
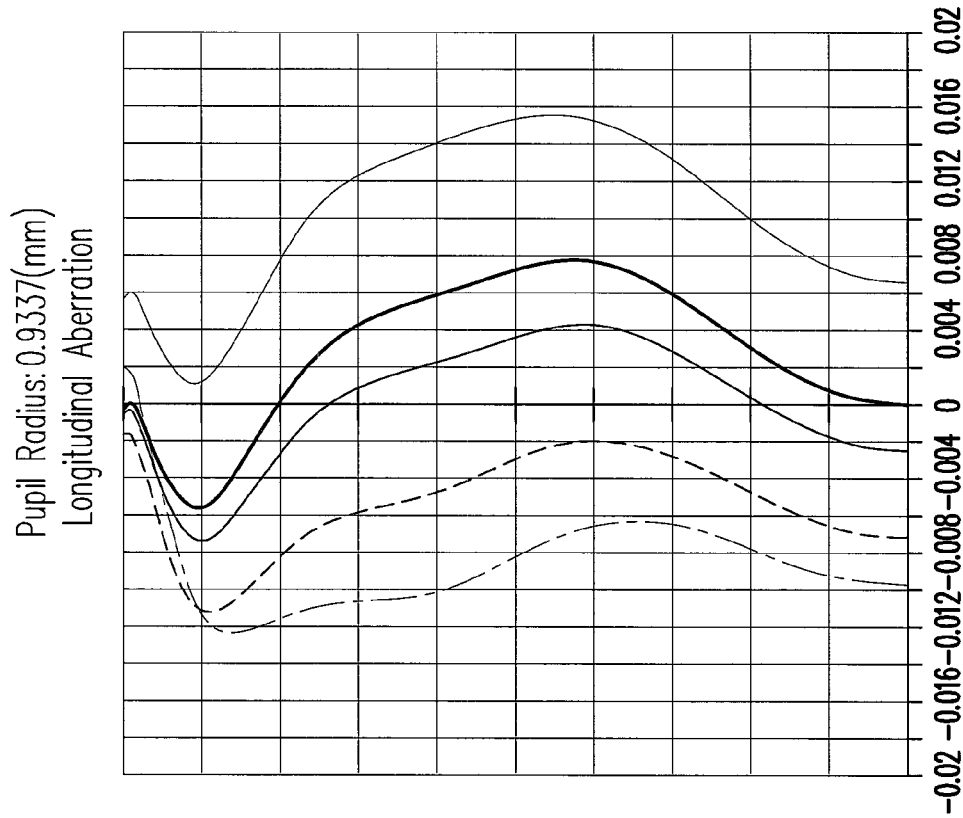
FIG. 1E is a curve diagram of a longitudinal color aberration of the imaging lens 100.
Figure 1D:
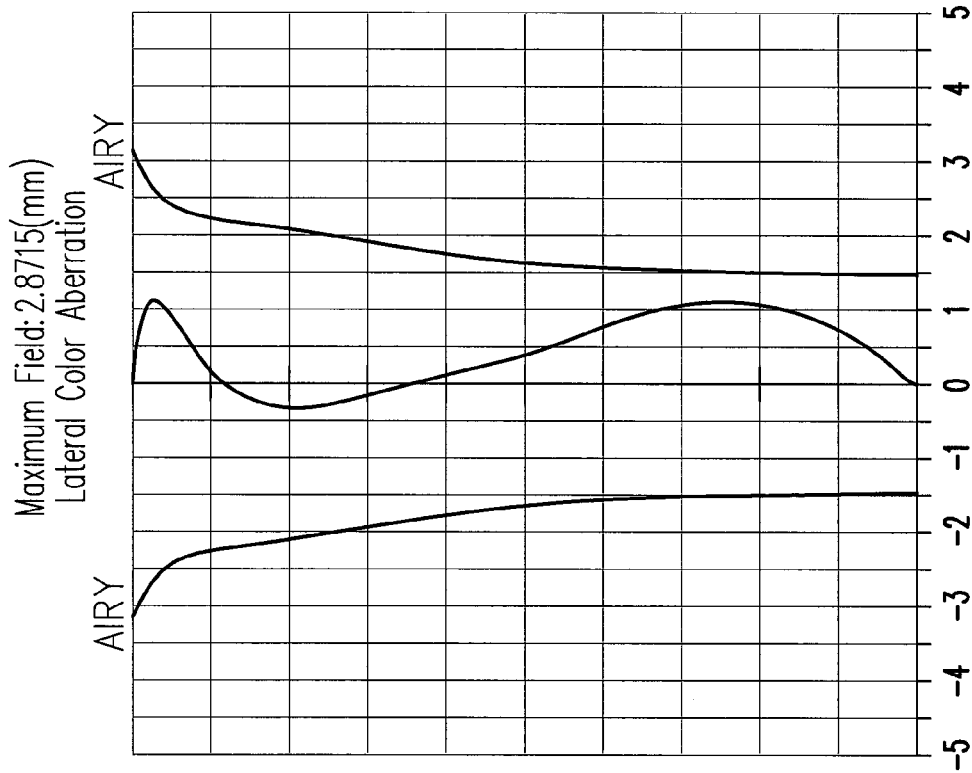
FIG. 1D is a curve diagram of a lateral color aberration of the imaging lens 100.

The imaging lens 100 shown in FIG. 1A is used to perform the optical simulation, in order to obtain the related figures of the optical performance in FIG. 1B~FIG. 1E. FIG. 1B is a curve diagram of a field curvature of the imaging lens 100. FIG. 1C is a curve diagram of a distortion of the imaging lens 100. FIG. 1D is a curve diagram of the lateral color aberration of the imaging lens 100. FIG. 1E is the curve diagram of the longitudinal color aberration of the imaging lens 100. It should be noted that there are five curved lines illustrated in the curve diagram of the longitudinal color aberration in FIG. 1E, which respectively represent the longitudinal colors aberration produced by the light of the five different wavelengths passing through the imaging lens 100. According to the above figures illustrated in FIG. 1B~FIG. 1E, it should be understood that the imaging lens 100 of this embodiment may generate an outstanding imaging quality.

Based on the above descriptions, the imaging lens of the invention at least has the following advantages:

The imaging lens comprises the first lens, the second lens, the third lens, the fourth lens and the fifth lens, and each has at least one aspheric surface. Furthermore, the imaging lens may further comprise the aperture and the transparent element. By satisfying the designed optical parameters for each of the optical elements and following its arrangement as described above, the imaging lens is able to obtain the characteristics of outstanding optical performance, shorter optical total length and larger aperture, thereby applying in a variety of high pixel and slim camera modules, and achieving the desired imaging quality.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An imaging lens, comprising in sequence from an object side to an image side:

a first lens, having at least one aspheric surface;

a second lens, having negative optical power and comprising at least one aspheric surface and a convex surface of the second lens is facing toward the object side;

a third lens, having positive optical power and comprising at least one aspheric surface and a concave surface of the third lens is facing toward the object side;

a fourth lens, having negative optical power and comprising at least one aspheric surface and a concave surface of the fourth lens is facing toward the image side; and a fifth lens, having positive optical power and comprising at least one aspheric surface and a convex surface of the fifth lens is facing toward the object side, wherein the imaging lens has a focal length f, and the first lens has a focal length f1, a focal length of the fourth lens is f4, and a focal length of the fifth lens is f5, which satisfy:

$$0.65 < \left|\frac{f1}{f}\right| < 0.85 \text{ and } 0.1 < \left|\frac{f4}{f5}\right| < 0.3.$$

2. The imaging lens as claimed in claim 1, further comprising:
an aperture, disposed at a position between a surface of the first lens facing the object side and a surface of the first lens facing the image side.

3. The imaging lens as claimed in claim 1, wherein, the fifth lens has at least two inflection points.

4. The imaging lens as claimed in claim 3, wherein, the fifth lens has uniform thickness.

5. The imaging lens as claimed in claim 1, wherein, the imaging lens has a back focal length $D_{bf}$, and a distance from a surface of the first lens facing the object side to an image plane is set as an optical total length D, which satisfy:

$0.25 < D_{bf}/D.$

6. The imaging lens as claimed in claim 1, wherein, a distance from a surface of the first lens facing the object side to an image plane is set as an optical total length D, and a half image height of an image located at the image plane is ImaH, which satisfy:

ImaH / D>0.59.

7. The imaging lens as claimed in claim 1, wherein, the imaging lens has the focal length f, and a distance between the first lens and the second lens is D12, which satisfy:

$$27 < \frac{f}{D12} < 195.$$

8. The imaging lens as claimed in claim 1, wherein, a distance between the first lens and the second lens is D12, and a distance between the third lens and the fourth lens is D34, which satisfy:

$$1 < \frac{D12}{D34} < 7.$$

9. The imaging lens as claimed in claim 1, wherein, the imaging lens has the focal length f, and a distance between the fourth lens and the fifth lens is D45, which satisfy:

$$16 < \frac{f}{D45} < 26.$$

10. The imaging lens as claimed in claim 1, wherein, the imaging lens has a view range of 70~75°.

11. The imaging lens as claimed in claim 1, wherein, the imaging lens has a f-number of 2~3.

12. The imaging lens as claimed in claim 1, wherein, the imaging lens has a chief ray angle of 0~27.5°.

13. The imaging lens as claimed in claim 1, wherein, a material of at least one of the first lens, the second lens, the third lens, the fourth lens and the fifth lens includes plastic.

14. The imaging lens as claimed in claim 1, further comprising:
a transparent element, disposed at a side of the fifth lens facing the image side.

* * * * *